(12) United States Patent
Vollmer et al.

(10) Patent No.: US 11,104,239 B1
(45) Date of Patent: Aug. 31, 2021

(54) MOBILE EQUIPMENT STORAGE AND CHARGING STATION

(71) Applicants: Eric Vollmer, Springdale, AR (US); Christopher DeMoss, Springdale, AR (US)

(72) Inventors: Eric Vollmer, Springdale, AR (US); Christopher DeMoss, Springdale, AR (US)

( * ) Notice: Subject to any disclaimer, the term of this patent is extended or adjusted under 35 U.S.C. 154(b) by 0 days.

(21) Appl. No.: 16/818,568

(22) Filed: Mar. 13, 2020

Related U.S. Application Data

(63) Continuation-in-part of application No. 16/008,649, filed on Jun. 14, 2018, now abandoned, which is a continuation-in-part of application No. 14/992,561, filed on Jan. 11, 2016, now abandoned.

(60) Provisional application No. 62/101,453, filed on Jan. 9, 2015.

(51) Int. Cl.

| | |
|---|---|
| *B60L 53/30* | (2019.01) |
| *B65D 88/12* | (2006.01) |
| *B65D 90/00* | (2006.01) |
| *B60L 53/51* | (2019.01) |
| *E05B 83/02* | (2014.01) |
| *B66F 7/06* | (2006.01) |

(52) U.S. Cl.
CPC ............... *B60L 53/30* (2019.02); *B60L 53/51* (2019.02); *B65D 88/121* (2013.01); *B65D 90/006* (2013.01); *B66F 7/065* (2013.01); *E05B 83/02* (2013.01); *B60L 2200/40* (2013.01); *B65D 2590/0083* (2013.01); *B65D 2590/668* (2013.01)

(58) Field of Classification Search
CPC ........ H02J 7/0052; H02J 3/385; H02J 7/0042; H02J 2007/0059; H02J 7/355; H05B 33/0842; B65D 90/008; B65D 88/12; B65D 90/006; B65D 88/121; B65D 2590/0083; B65D 2590/668; B60L 53/30; B60L 53/51; B60L 2200/40; E05B 83/02; B66F 7/065
See application file for complete search history.

(56) References Cited

U.S. PATENT DOCUMENTS

| | | | |
|---|---|---|---|
| 4,334,812 A | 6/1982 | Delatush | 410/52 |
| 4,688,244 A | 8/1987 | Hannon et al. | 379/58 |
| 5,037,255 A | 8/1991 | Bullock et al. | 410/30 |
| 5,816,423 A | 10/1998 | Fenton et al. | 220/1.5 |
| 6,406,249 B1 | 6/2002 | McAdams et al. | 414/800 |
| 6,882,269 B2 | 4/2005 | Moreno | 340/4.73 |
| 7,196,622 B2 | 3/2007 | Lambright et al. | 340/539.26 |
| 7,357,530 B2 | 4/2008 | Wang et al. | 362/249 |
| 7,484,391 B1 | 2/2009 | Moore | 70/257 |
| 8,078,138 B2 | 12/2011 | Shinoda | 455/404.2 |
| 8,078,139 B2 | 12/2011 | Twitchell, Jr. | 455/404.2 |
| 8,240,495 B2 | 8/2012 | Ronci et al. | 220/4.33 |
| 8,746,805 B1 | 6/2014 | Petzitillo, Jr. et al. | 298/23 |
| 8,867,187 B2 | 10/2014 | Dick et al. | 361/111 |
| 9,296,554 B2 | 3/2016 | Ferren | |
| 2001/0035410 A1 | 11/2001 | Taube et al. | 220/1.5 |
| 2007/0200664 A1 | 8/2007 | Proska et al. | 340/5.42 |
| 2012/0048903 A1 | 3/2012 | Fowler et al. | 224/488 |
| 2012/0253581 A1 | 10/2012 | Anderson | 701/23 |
| 2015/0188360 A1 | 7/2015 | Doane et al. | |

*Primary Examiner* — Jung Kim
(74) *Attorney, Agent, or Firm* — Kiesling & Pieper PLC; David B. Pieper; Trent C. Keisling

(57) ABSTRACT

A shippable, balanced, self-contained, solar-powered, battery-charging, restricted-access, parkable, equipment station.

18 Claims, 9 Drawing Sheets

MOBILE EQUIPMENT STORAGE AND CHARGING STATION

CROSS-REFERENCE TO RELATED APPLICATIONS

This application claims priority as a continuation in part of U.S. application Ser. No. 16/008,649 filed by Vollmer et al. on Jun. 14, 2018 entitled MOBILE EQUIPMENT STORAGE AND CHARGING STATION which is a continuation in part of U.S. application Ser. No. 14/992,561 filed by Vollmer et al. on Jan. 11, 2016 entitled MOBILE EQUIPMENT STORAGE AND CHARGING STATION, which claims priority to U.S. Provisional Application Ser. No. 62/101,453 filed by Vollmer et al. on Jan. 9, 2015 entitled MOBILE EQUIPMENT STORAGE AND CHARGING STATION which is hereby incorporated by reference in its entirety.

BACKGROUND OF THE INVENTION

1. Field of the Invention

The present invention relates to improvements in providing equipment to remote locations within limited time frames, limited security, and limited power access. More particularly, the invention relates to an equipment storage station and method of use particularly suited for providing scissor lifts to construction and maintenance properties without requiring that the user maintain a commercial driver's license, haul the equipment during transfers, and fit into a strict time schedule. In particular, the present invention relates specifically to a shippable, balanced, self-contained, solar-powered, battery-charging, restricted-access, parkable, equipment station.

2. Description of the Known Art

As will be appreciated by those skilled in the art, shipping containers or intermodal containers are known in various forms. Standard shipping containers have two doors fitted at one end, and is made of corrugated weathering steel with a plywood floor. Containers are 8-foot, 2.44 m wide by 8 ft 6 in, 2.59 m high, and either a nominal 20-foot, 6.1 m or 40-foot, 12.19 m long. Shipping containers are built per International Organization for Standardization, ISO, standards including:

ISO 6346:1995 Freight containers—Coding, identification and marking

ISO 668:2013 Series 1 freight containers—Classification, dimensions and ratings

ISO 1161:1984 Series 1 freight containers—Corner fittings—Specification

ISO 1496-1:2013 Series 1 freight containers—Specification and testing—Part 1: General cargo containers for general purposes.

Patents disclosing information relevant to shipping containers include:

U.S. Pat. No. 5,037,255, issued to Bullock, et al. on Aug. 6, 1991 entitled Wheel chock for a motor vehicle container; U.S. Pat. No. 5,816,423, issued to Fenton, et al. on Oct. 6, 1998 entitled Intermodal container; U.S. Pat. No. 6,406,249, issued to McAdams, et al. on Jun. 18, 2002 entitled Freight container, system, and method for shipping freight; U.S. Pat. No. 7,196,622, issued to Lambright, et al. on Mar. 27, 2007 entitled State monitoring of a container; U.S. Pat. No. 7,196,622, issued to Lambright, et al. on Mar. 27, 2007 entitled State monitoring of a container; U.S. Pat. No. 8,078,139, issued to Twitchell, Jr. on Dec. 13, 2011 entitled Wireless data communications network system for tracking container, U.S. Pat. No. 8,240,495, issued to Ronci, et al. on Aug. 14, 2012 entitled Container internal lock mechanism; U.S. Pat. No. 8,746,805, issued to Petzitillo, Jr., et al. on Jun. 10, 2014 entitled Apparatus and method for remotely locking a container; and U.S. Pat. No. 8,867,187, issued to Dick, et al. on Oct. 21, 2014 entitled Apparatus for powering an accessory device in a refrigerated container. Each of these patents is hereby expressly incorporated by reference in their entirety.

Other patents and applications of note include:

U.S. Pat. No. 4,688,244, issued to Hannon, et al. on Aug. 18, 1987 entitled Integrated cargo security system; U.S. Pat. No. 6,882,269, issued to Moreno on Apr. 19, 2005 entitled System and method for remotely coordinating the secure delivery of goods; U.S. Pat. No. 7,484,391, issued to Moore on Feb. 3, 2009 entitled Door lock system for trailers and cargo containers; and United States Patent Application No. 2007/0200664, filed by Proska et al. on Aug. 30, 2007 System and method for providing and tracking equipment. Each of these patents and the application are hereby expressly incorporated by reference in their entirety.

From these prior references it may be seen that these prior art patents are very limited in their teaching and utilization, and an improved mobile equipment storage and charging station is needed to overcome these limitations.

SUMMARY OF THE INVENTION

The present invention is directed to an improved mobile equipment storage and charging station. In accordance with one exemplary embodiment of the present invention, a mobile equipment storage and charging station is provided using a shippable, balanced, self-contained, solar-powered, battery-charging, restricted-access, parkable, equipment station.

One advantage of the present invention is that the equipment station is shippable because it compacts down to the size standard for an intermodal shipping container, has secured component construction, and includes an internal tie down system for strapping down the equipment being housed and shipped inside the station.

Another advantage of the present invention is that the equipment station is balanced with the solar panels, internal charge storage batteries, and parked equipment all centered on both the side and end lifting locations with the batteries providing a low center of gravity such that the station always presents a substantially balanced and gravity stable load for shipping, regardless of whether it is loaded with equipment.

A still further advantage of the present invention is that the equipment station is self-contained because all of the necessary equipment including the equipment access door, access lock, access panel, access control system, communication system, equipment ramp, parking blocks, solar power panels, storage batteries, power inverter, power charging control, power supplies, and wiring are all contained within the unit.

Yet another advantage is provided because the equipment station provides solar charging cells and a charging inverter for charging the internal storage batteries. Even further, the internal batteries are also connected to an equipment battery charging control with an external power connection for charging the equipment during shipping and storage.

An additional advantage is that the equipment station provides restricted-access through the use of remote communication via a communication system including a wireless cell phone communication standard.

One more advantage is provided in the system being a standard parking size for placement in readily available parking lots for storage of the equipment station until access is needed.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
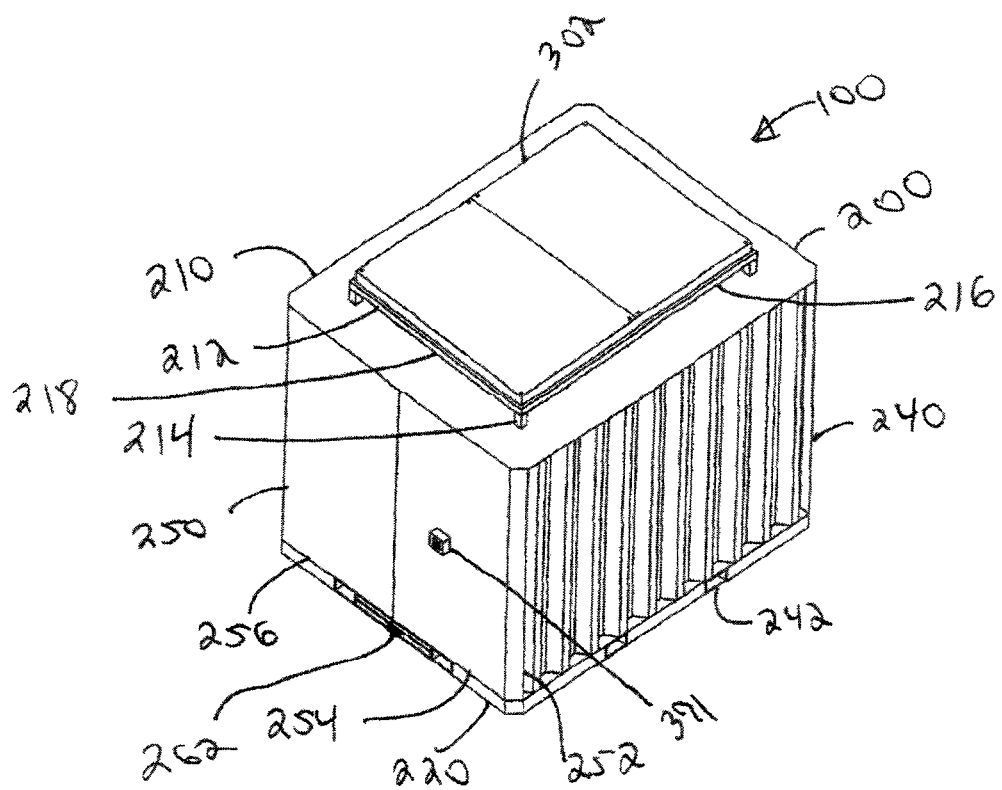
FIG. 1 is a perspective view of an equipment station.
Figure 2:
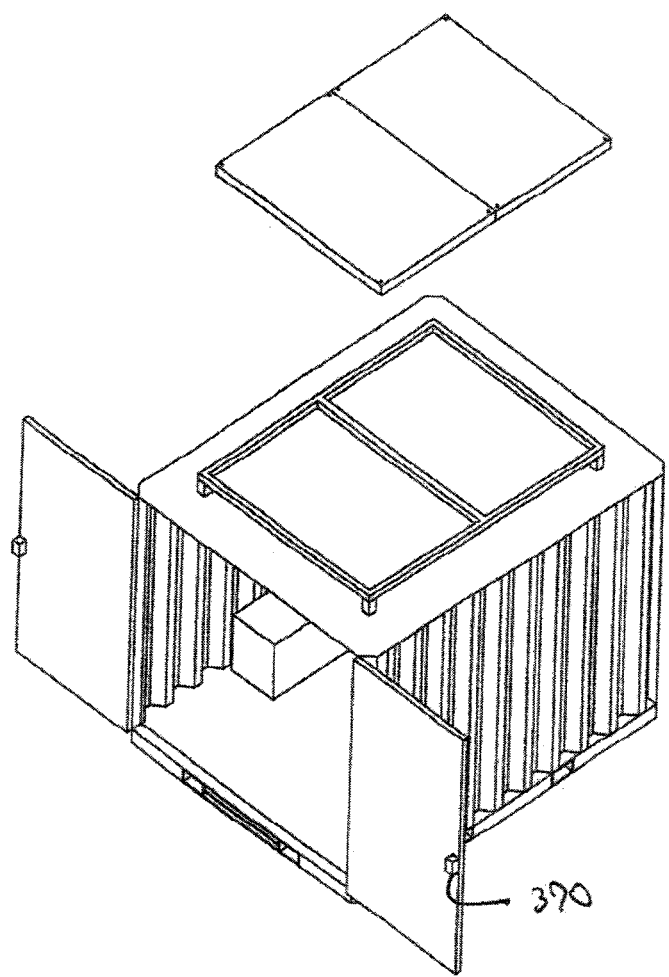
FIG. 2 is a perspective view of the equipment station with the doors open and the solar panel exploded from the top.
Figure 3:
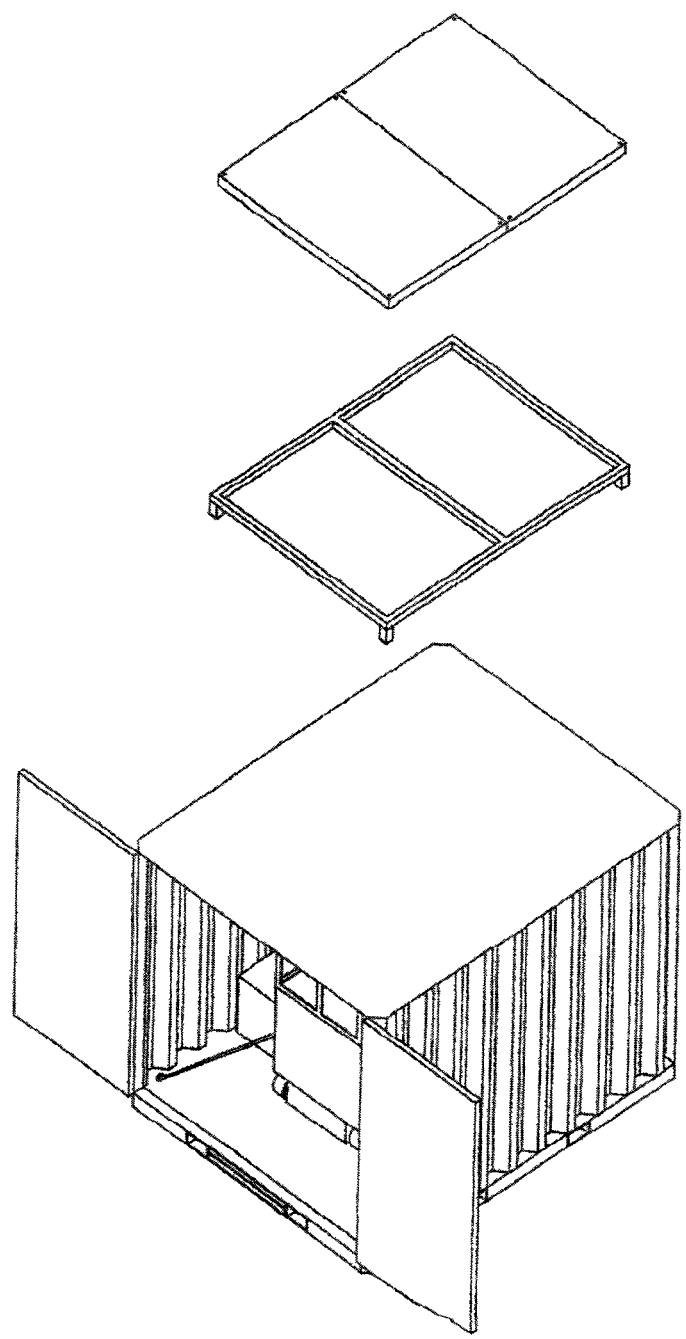
FIG. 3 is a perspective view of the equipment station with the doors open and the solar panel and supporting frame exploded from the top.
Figure 4:
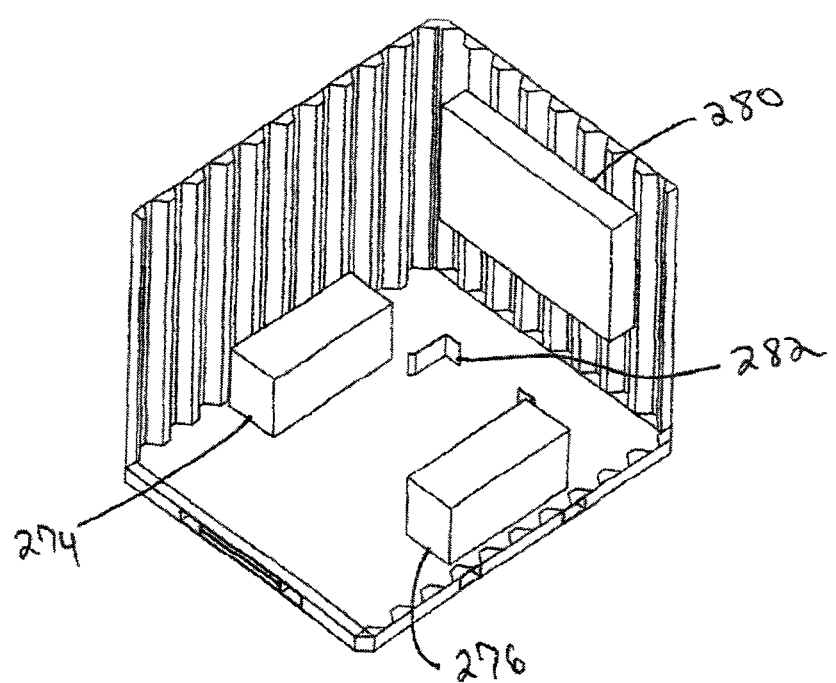
FIG. 4 is a perspective view of the equipment station with the top, doors, and one side wall removed.
Figure 5:
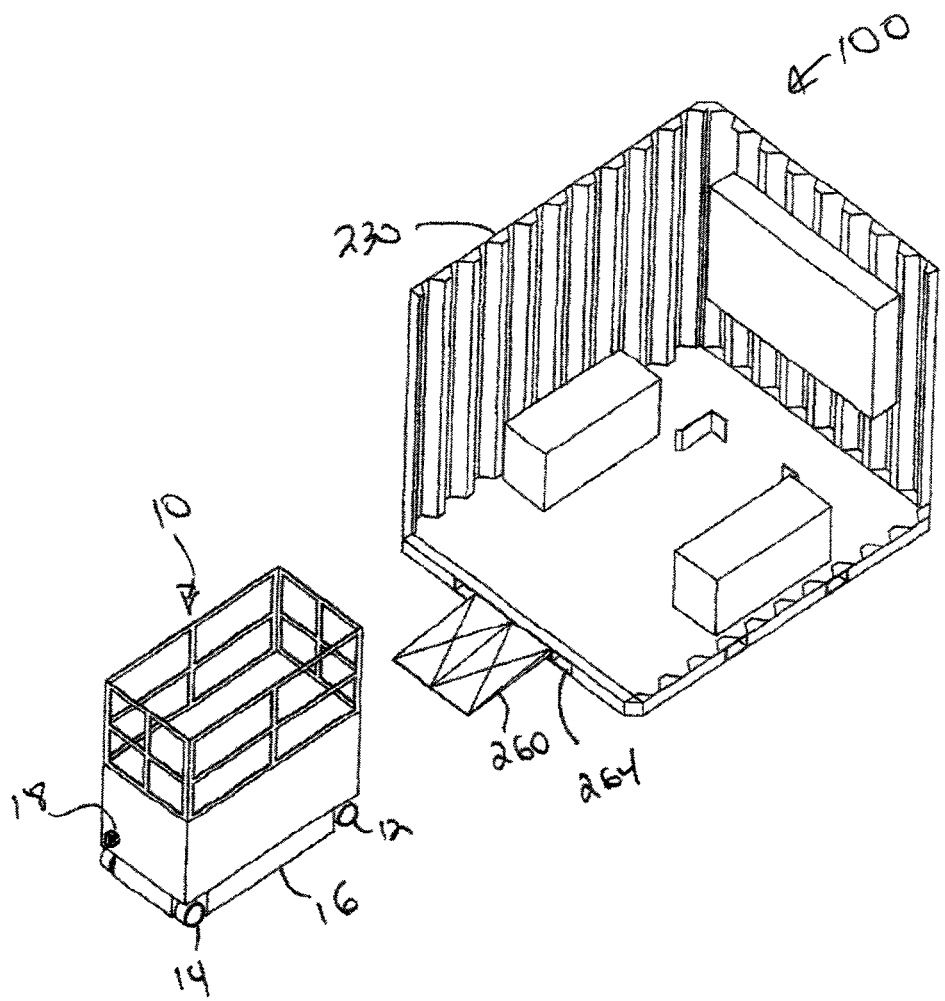
FIG. 5 is a perspective view of the equipment station of FIG. 4 with the ramp extended and a scissor lift positioned for loading.
Figure 6:
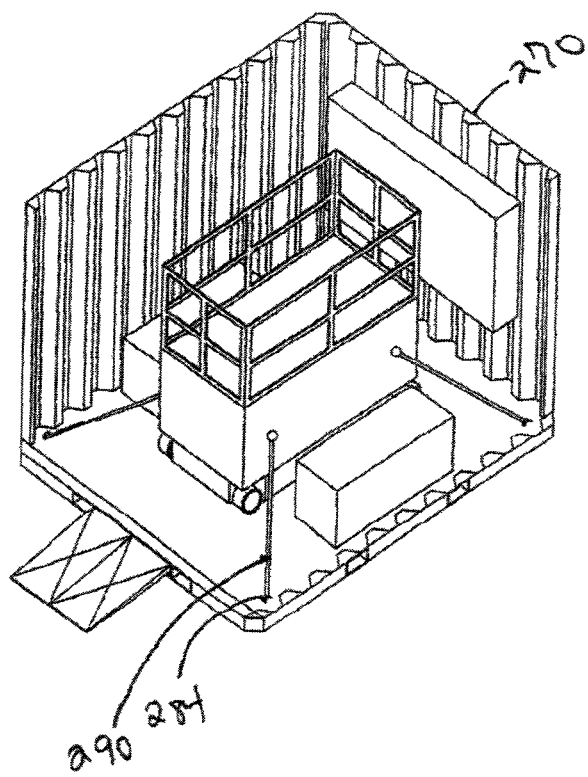
FIG. 6 is a perspective view of the equipment station of FIG. 4 with the scissor lift loaded and strapped down.
Figure 7:
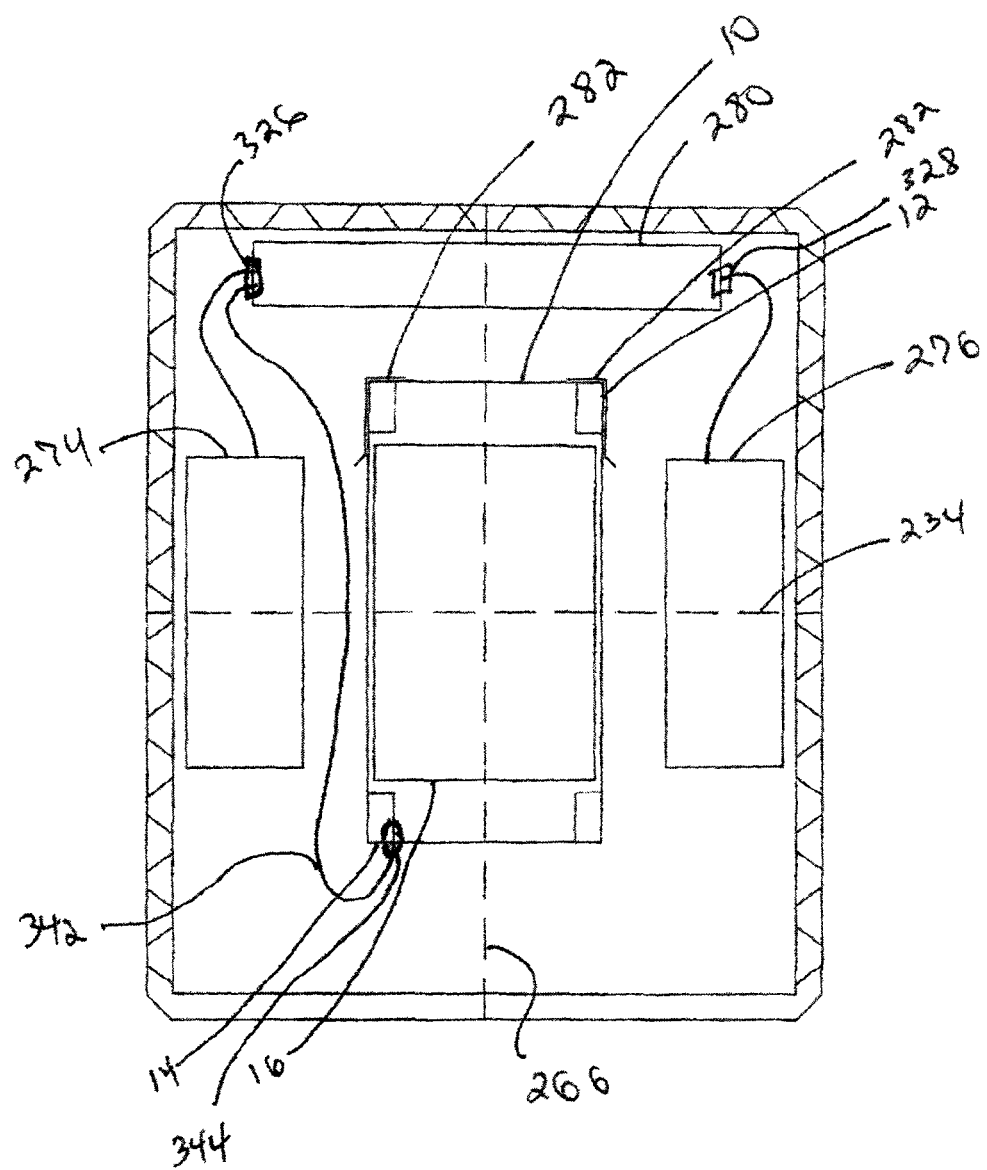
FIG. 7 is a top schematic view of the positioning of the loaded scissor lift and batteries and balancing axis.
Figure 9:
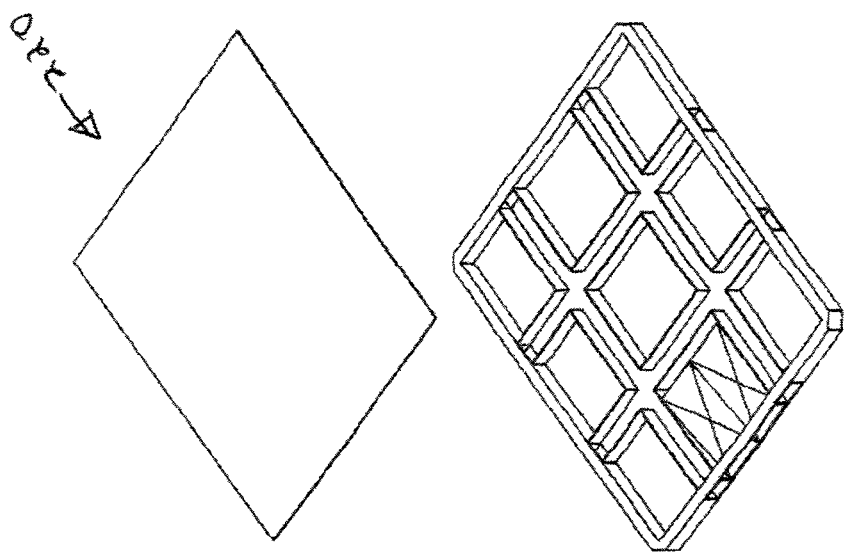
FIG. 9 is an exploded view of the floor with the ramp retracted.
Figure 8:
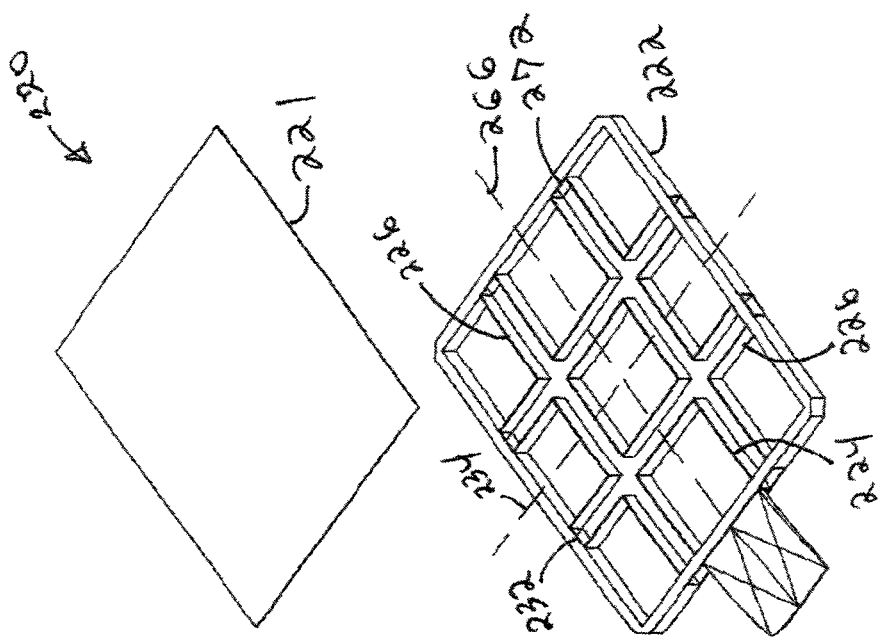
FIG. 8 an exploded view of the floor with the ramp extended and showing the relative position of the fork tubes and the axis.
Figure 10:
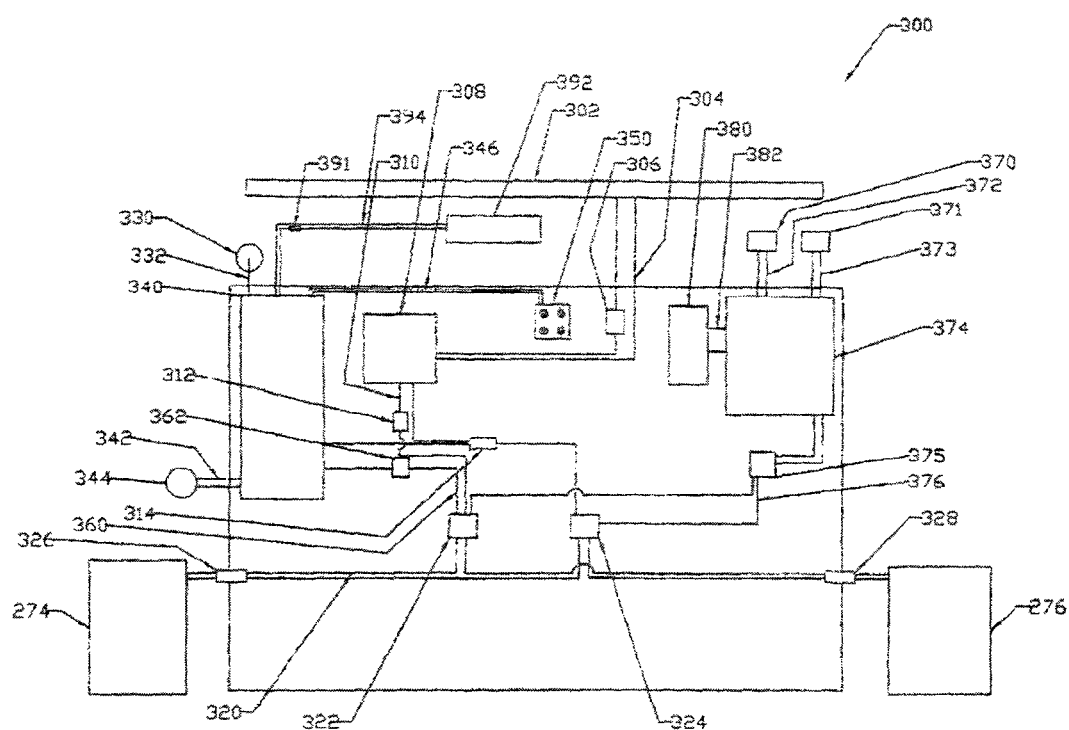
FIG. 10 is a schematic view of the power circuit in the cabinet on the back wall.

As shown in FIG. 1 of the drawings, one exemplary embodiment of the present invention is generally shown as an equipment station 100 for holding a piece of equipment 10 which is shown as a scissor lift 10 although other pieces of equipment such as cherry pickers, floor polishers, concrete screeds, etc. are also envisioned. The initial embodiment was designed for providing a scissor lift 10. Scissor lifts 10 are generally provided with a low center of gravity by providing a heavy motor, a heavy battery, and a substantial ballast to stabilize the device when the lift is in operation. The scissor lift 10 is supported by front wheels 12 and back wheels 14 that support a lift body 16 that houses the lift motor and lift batteries. The lift batteries are charged through a charging connector 18.

The equipment station 100 is constructed from two main components including the container body 200 and the power circuit 300.

In order to make the equipment station portable, it is desirable necessary to make the device deployable from a truck platform with either a gravity deployment using an angling truck bed, tow truck, flat bed and crane truck, or using standard fork lifts that can be hauled on the same truck. For both of these considerations, balancing the equipment station 100 and providing lift points becomes critical. Standard ISO lifting point corners and other connections can be provided. The container body of the present invention can provide these elements for transportation as well as several other aspects to increase safety of the deployment.

The container body 200 is made with a container top 210 that supports a panel support frame 212 that supports the solar panels 302. The panel support frame 212 is held above the container top 210 by panel legs 214. The panel legs 214 support side beams 216 that then support spanning joists 218. The solar panels 302 are bolted to the spanning joists 218.

The container bottom 220 is made with an interior floor 221 and standing frame 222 including the corner locks as known in the art. Unique features of the container bottom include the ramp aperture 224 allowing the front ramp 260 to recess or retract into the container bottom 220 for compaction for shipping. The front ramp 260 is deployed in front of the front door 254 to allow the equipment 10 to be rolled or driven into and out of the container body 200. The front ramp 260 is not removable from the container and can be locked in both the extended and retracted positions.

The container bottom 220 also defines the side and end lifting channels 226 which are positioned to correspond with the left lifting tubes 232, right lifting tubes 242, front lifting tubes 264, and back lifting tubes 272. The lifting channels 226 are perpendicular to the walls 230, 240, 250, 270 that they intersect and are positioned on alternate sides of the centerline of the wall 230, 240, 250, 270. The left container side wall 230 defines the left lifting tubes 232 with the space between them defining the side balance axis 234. The right container side wall 240 defines right lifting tubes 242 aligning with the left lifting tubes 232. The left battery 274 and right battery 276 are centered over the side balance axis 234 and equidistance positioned from the end balance axis 266. The batteries 274, 276 are deep cycle fork lift batteries selected to provide sufficient storage for several days of scissor lift use with minimal input from the solar charging panels.

The front wall 250 includes a door frame 252 mounting a front access door 254 sized to allow for the equipment 10 to be loaded and unloaded front the container 100. The front access door can be constructed as a twin panel door 256 although a roll up door or overhead single or multiple type panel can also be used. The roll up door does not blow in the wind and easily clears the equipment 10 while minimizing the danger of the door or equipment being damaged, but requires separate positioning of the lock 370 and access panel 371. The interior door access lock 370 is electrically controllable and lock or unlocks the door from inside the container. The exterior door access panel 371 is controlled through the external lock control 374 to unlock the door using a key sequence or other identifier.

The front ramp 260 is held in place with a ramp lock 262 and is positioned in the standing frame 222 between the front lifting tubes 264. The front lifting tubes 264 are centered on the end balance axis 266. The back wall 270 has similarly aligned back lifting tubes 272.

The equipment cabinet 280 is positioned on the back wall 270 and houses the equipment for the power circuit 300.

Wheel chocks 282 are mounted to the floor 221 to center the scissor lift or other equipment 10 over the side balance axis 234 and end balance axis 266. The wheel chocks 282 sense the presence of the scissor lift through the use of a pressure switch contacting the tire, a transducer positioned under the tire, or a break beam type of visual sensor to verify the position of the scissor lift in the container body 200 and wirelessly communicate this through the remote access control 380.

Tie down loops 284 are connected to the floor 221 so that tie down straps 290 can be used to secure the equipment 10 for transport.

The power circuit 300 includes solar panels 302 electrically connected via a panel wiring harness 304 including a solar input circuit breaker 306 to the solar power converter 308. The solar power converter 308 is a AIMS POWER (trademark) Aims MPPT+ Series Solar Charge Controller SCC40MPPT available from Aims Corp., 9736 S. Virginia St. STE A, Reno, Nev. 89511. The solar power converter 308 is electrically connected via the solar output wiring harness 310, including a solar output circuit breaker 312 and a solar output charging detector 314, to the first battery power connection 322 and the second battery power connection 324 to charge the left battery 274 and the right battery 276. A charging fan 313 can also be integrated into the solar output wiring harness 310 to turn on during the charging process.

The first battery power connection 322 and the second battery power connection 324 are electrically connected via the battery wiring harness 320 to the first battery disconnect 326 and second battery disconnect 328 to the left battery 274 and right battery 276 so that the batteries can be easily changed out.

An external power charging port 330 is connected through the port wiring harness 332 to the power input converter 340. The power input converter is a AIMS POWER (trademark) Global LF Series Pure Sine Wave Inverter/Solar Charger available from Aims Corp., 9736 S. Virginia St. STE A, Reno, Nev. 89511. Similarly, the left battery 274 and right battery 276 are connected through the charging output wiring harness 360, including the charging output circuit breaker 362, to the power input converter 340. The power input converter 340 is connected through the equipment output wiring harness 342 to the equipment connector 344. In this manner the power input converter 340 can use either solar or battery power to charge equipment 10. Typical household 110 volt power connectors 350 are also connected through an auxiliary output wiring harness 346 to the power input converter 340 to provide a source of standard power within the equipment station 100 for items such as internal lights on a timer.

A door access lock 370 is electrically connected through the lock wiring harness 372 to the lock control 374. Similarly, the door access panel 371 is electrically connected through the access wiring harness 373 to the lock control 374. The door access panel 371 is a DOORKING(trademark) RS485 Keypad. The lock control 374 is powered by the power supply wiring harness 376, including the lock power supply 375, that is electrically connected to the first battery power connection 322 and the second battery power connection 324 for an uninterrupted power source. The Lock control 374 is a DOORKING (trademark) Model 1838 Access Plus PC Programmable Access Control System. DOORKING (trademark) is located at DoorKing, Inc. 120 Glasgow Avenue, Inglewood Calif. 90301. The lock control 374 is also connected to the wireless remote access control 380 by the remote wiring harness 382.

In one embodiment, a lighting wiring harness 394 connects to a power connector 350 and includes both a door sensor 390 and a timer light switch 391 to selectively control an LED lighting system 392 to minimize power consumption.

Reference numerals used throughout the detailed description and the drawings correspond to the following elements:
Equipment 10
Front wheels 12
Back wheels 14
Lift body 16
Charging connector 18
Equipment station 100
Container body 200
Container top 210
Panel support frame 212
Panel legs 214
Side beams 216
Spanning joists 218
Container bottom 220
Interior floor 221
Standing frame 222
Ramp aperture 224
Lifting channels 226
Left container side wall 230
Left side lifting tubes 232
Side balance axis 234
Right container side wall 240
Right side lifting tubes 242
Front wall 250
Door frame 252
Front access door 254
Twin panel doors 256
Front ramp 260
Ramp lock 262
Front end lifting tubes 264
End balance axis 266
Back wall 270
Back end lifting tubes 272
Left battery 274
Right battery 276
Equipment cabinet 280
Wheel chocks 282
Tie down loops 284
Tie down straps 290
Power circuit 300
Solar panels 302
Panel wiring harness 304
Solar input circuit breaker 306
Solar power converter 308
Solar output wiring harness 310
solar output circuit breaker 312
solar output charging detector 314
battery wiring harness 320
first battery power connection 322
second battery power connection 324
first battery disconnect 326
second battery disconnect 328
External power charging port 330
Port wiring harness 332
External power input converter 340
equipment output wiring harness 342
equipment connector 344
auxiliary output wiring harness 346
Power connectors 350
Charging output wiring harness 360
Charging output circuit breaker 362
Door access lock 370
Door access panel 371
Lock wiring harness 372
Access wiring harness 373
Lock control 374

Lock power supply 375
Power supply wiring harness 376
Wireless remote access control 380
Remote wiring harness 382
door sensor 390
timer light switch 391
lighting system 392
lighting wiring harness 394

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A portable equipment station apparatus for selective storage and removal of equipment, the equipment having wheels, a center of gravity behind the wheels, and a charging connector, the equipment station apparatus comprising:
   a container body including
   a front wall defining a door frame,
   a left side wall connected to the front wall,
   a back wall connected to the left side wall, a long axis extending from the front wall to the back wall;
   a right side wall connected to the back wall and the front wall,
   a top connecting the front, left side, back, and right side walls,
   an interior floor,
   wheel chocks attached to the interior floor,
   a first horizontal lifting tube and a second horizontal lifting tube positioned under the interior floor, the first horizontal lifting tube including and the second horizontal lifting tube including end access horizontal lifting tubes; and
   the wheel chocks positioned to contact the wheels to position the center of gravity between the end access horizontal lifting tubes,
   a door mounted in the door frame;
   at least one battery positioned in the container body, the at least one battery including a first battery and a second battery, the first battery positioned between the end access lifting tubes and the left side wall and the second battery positioned between the end access lifting tubes and the right side wall; and
   a power circuit positioned on the back wall including
   a power converter electrically connected to the at least one battery, and
   an equipment connector electrically connected to the power converter for selectively electrically connecting to the charging connector.

2. The apparatus of claim 1, further comprising:
the first horizontal lifting tube and the second horizontal lifting tube including side access horizontal lifting tubes; and
the container and battery defining a side balance axis positioned between the first horizontal lifting tube and the second horizontal lifting tube when the equipment is loaded against the wheel chocks.

3. The apparatus of claim 1, further comprising:
the first horizontal lifting tube and the second horizontal lifting tube including side access horizontal lifting tubes; and
the container and battery defining a side balance axis positioned between the first horizontal lifting tube and the second horizontal lifting tube when the equipment is removed from the container.

4. The apparatus of claim 1, further comprising:
the container and battery defining an end balance axis positioned between the first horizontal lifting tube and the second horizontal lifting tube when the equipment is loaded against the wheel chocks.

5. The apparatus of claim 1, further comprising:
the first horizontal lifting tube and the second horizontal lifting tube including end access horizontal lifting tubes; and
the container and battery defining an end balance axis positioned between the first horizontal lifting tube and the second horizontal lifting tube when the equipment is removed from the container.

6. The apparatus of claim 1, further comprising:
the first horizontal lifting tube and the second horizontal lifting tube including side horizontal lifting tubes; and
the container and first and second battery defining a side balance axis positioned between the first horizontal lifting tube and the second horizontal lifting tube when the equipment is loaded against the wheel chocks.

7. The apparatus of claim 1, further comprising:
the first horizontal lifting tube and the second horizontal lifting tube including side access horizontal lifting tubes;
the battery including a first battery and a second battery; and
the container and first and second battery defining a side balance axis positioned between the first horizontal lifting tube and the second horizontal lifting tube when the equipment is removed from the container.

8. The apparatus of claim 1, further comprising:
the container and first and second battery defining an end balance axis positioned between the first horizontal lifting tube and the second horizontal lifting tube when the equipment is loaded against the wheel chocks.

9. The apparatus of claim 1, further comprising:
the container and first and second battery defining an end balance axis positioned between the first horizontal lifting tube and the second horizontal lifting tube when the equipment is removed from the container.

10. The apparatus of claim 1, further comprising:
a front ramp positioned at the door frame.

11. The apparatus of claim 6, the container further defining a ramp aperture for retracting the front ramp under the interior floor.

12. The apparatus of claim 1, further comprising:
solar panels mounted over the top and electrically connected to the power converter.

13. The apparatus of claim 1, further comprising:
an exterior power connector mounted on the container body and electrically connected to the power converter.

14. The apparatus of claim 1, further comprising:
an interior power connector electrically connected to the power converter.

15. The apparatus of claim 1, further comprising:
interior lights electrically connected to the power converter.

16. The apparatus of claim 1, further comprising:
a timer light switch electrically connected between the interior lights and the power converter.

17. The apparatus of claim 1, further comprising:
an interior door access lock controlled by an exterior door access panel.

18. The apparatus of claim 1, further comprising:
an interior door access lock controlled by a wireless remote access control.

\* \* \* \* \*